Feb. 13, 1951 — R. B. WADE — 2,541,850
SHAFT SEAL ARRANGEMENT
Filed June 10, 1946

Inventor:
Raymond B. Wade,
by *Burrell S. Mack*
His Attorney.

Patented Feb. 13, 1951

2,541,850

UNITED STATES PATENT OFFICE 2,541,850

SHAFT SEAL ARRANGEMENT

Raymond B. Wade, Swampscott, Mass., assignor to General Electric Company, a corporation of New York Application June 10, 1946, Serial No. 675,640

3 Claims. (Cl. 286—9)

My invention relates to a shaft seal arrangement for a machine having a sealed casing which is maintained at sub-ambient pressure during operation. In relates particularly to means for improving the efficiency of the oil seals for the shaft of a turbosupercharger rotor supported in a sealed bearing housing which is maintained at subatmospheric pressure during operation by means of a scavenging oil pump.

An object of my invention is to provide an improved shaft seal arrangement for a housing maintained at sub-ambient pressures during operation.

Another object of my invention is to reduce the tendency of oil or other fluids inside a sealed bearing housing to leak outwardly through the seals during high speed operation.

A further object is to prevent the creation of a vortex whirl at the exterior side of a shaft seal in the wall of a sealed housing and thereby create favorable pressure conditions tending to improve the effectiveness of the shaft seal.

Figure 1:
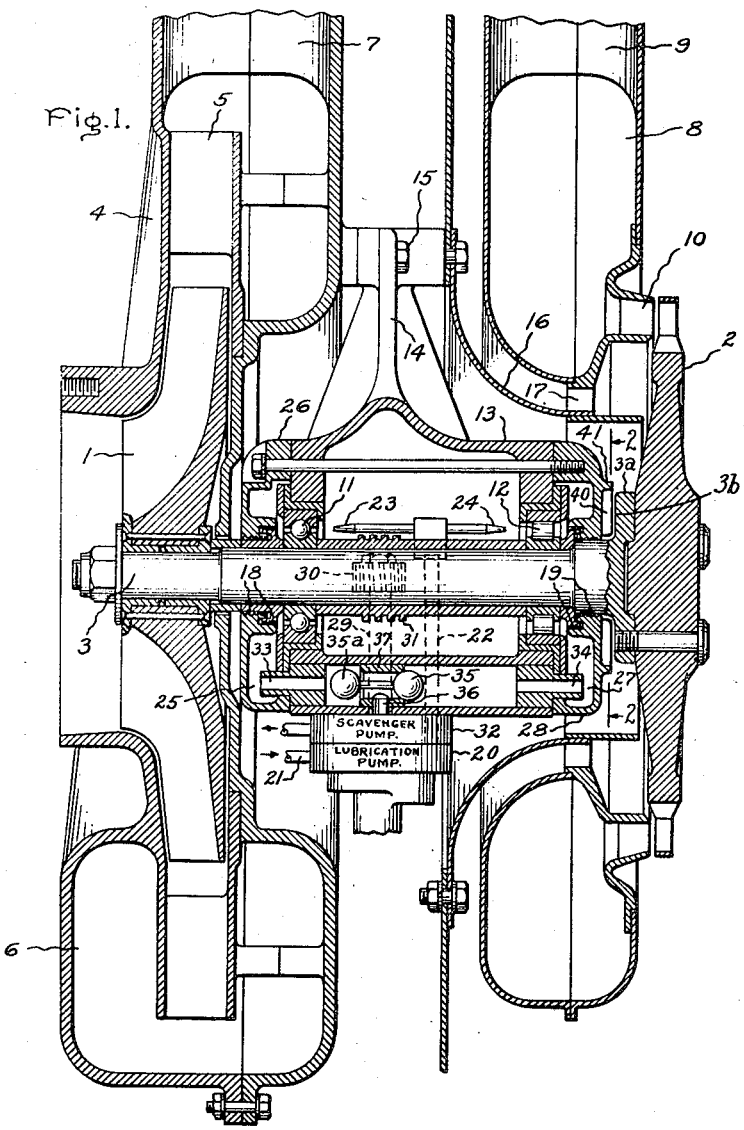
Figure 2:
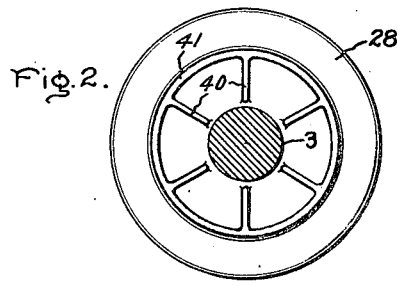

Other objects and advantages will be apparent from the following description taken in connection with the accompanying drawings, in which Fig. 1 is a sectional view of a turbosupercharger having a bearing housing and shaft seal arrangement embodying my invention; and Fig. 2 is an end view of the bearing housing taken in the direction of the arrows 2—2 in Fig. 1.

Fig. 1 discloses a turbosupercharger of known arrangement, including a centrifugal impeller 1 and a turbine wheel 2 supported on opposite ends of a common shaft 3. Impeller 1 is housed in a casing 4 which defines a diffuser 5 and a discharge scroll 6, the latter having a discharge opening 7. Turbine wheel 2 receives hot motive fluid from a nozzle-box 8 having an inlet 9 and a circumferential row of nozzles 10.

Shaft 3 is supported by suitable bearings 11 and 12 arranged at opposite ends of a bearing housing 13. Housing 13 is provided with a plurality of radially extending arms 14 which are secured to the compressor casing 4 by threaded fastenings 15, and to the nozzlebox 8 by means of an annular support baffle 16 and a plurality of circumferentially spaced lugs 17.

At the compressor end, shaft 3 is provided with suitable shaft sealing means, represented as a two-part labyrinth seal 18. A similar labyrinth seal 19 is provided at the turbine end of the shaft.

Lubricating oil for bearings 11 and 12 is supplied by means of a pressure pump 20 which receives oil from a suitable reservoir (not shown) through conduit 21, and discharges at a suitable pressure through conduit 22 and two nozzles 23 and 24, which are adapted to direct jets of cooling and lubricating oil onto the anti-friction bearings 11 and 12. The pump 20 may be driven by a shaft 29 which carries a spiral gear 30 meshing with a drive worm 31 formed integral with a sleeve surrounding and secured to the rotating shaft 3. Used oil will tend to accumulate in the lower part of bearing housing 13, specifically in the lowermost part of chamber 25 defined by end cap 26 and in chamber 27 formed by end cap 28.

Associated with lubricant supply pump 20 is a scavenging pump 32, also driven by shaft 29 and arranged to draw oil from chambers 25, 27 through the respective ports 33 and 34, past a double-acting gravity-biased check valve 35 to scavenger pump inlet port 36. When shaft 3 is tilted, with the turbine end higher than the compressor end, then check valve 35 will be in the position shown in Fig. 1, and pump 32 will draw oil from chamber 25 through port 33 and through the clearance space surrounding the spherical end 35a of the check valve. If the shaft tilts so that the compressor end is higher, then valve 35 will drop downward so that head 35a sealingly engages a seat formed in bushing 37, with the result that oil is scavenged from lower chamber 27 through passage 34 and the clearance provided between bushing 37 and ball 35. This check valve arrangement insures that oil will be drawn from the lowermost end of the bearing housing. Without the check valve, the scavenger pump 32 might merely suck air from the uppermost portion of the housing, permitting the housing to be flooded with oil.

The lubricant supply pump 20 and scavenger pump 32 may be of any suitable type, but are preferably simple positive displacement pumps, the details of which are not material to an understanding of the present invention. However, it is important to note that scavenger pump 32 has a capacity materially greater than that of the lubrication pump 20, so that all the oil and some of the air contained inside bearing housing 13 is drawn off by the scavenger pump. The result of this arrangement is that in operation the sealed bearing housing 13 is maintained with an interior pressure lower than that of the ambient atmosphere. Air therefore tends to leak inwardly past seals 18 and 19 into the housing 13. This in-leakage of air resists the tendency of oil to leak outwardly through the shaft seals.

It will be appreciated by those familiar with turbosuperchargers for aircraft engines that, unless it is carefully designed, a turbosupercharger may leak sufficient oil to creat a serious fire hazard in the airplane. Because of the high speeds of operation, the oil lost from the turbosupercharger appears as a finely atomized mist which readily forms a highly combustible mixture with the surrounding atmosphere. Obviously, such a fire hazard must be avoided at all costs. In the large scale production of such turbosuperchargers, it has been found that a very appreciable number have had to be rejected because of oil leakage as described above. In investigating this problem of turbosupercharger oil leakage, I discovered that with the shaft 3 turning at high speed there was a static pressure gradient produced in the space between the shaft flange 3a and the adjacent end of bearing housing end cap 28, the pressure being lower immediately adjacent shaft 3 and progressively rising as the radial distance from shaft 3 increased. The effect of this pressure gradient was to reduce the static pressure at the exterior side of shaft seal 19, thereby reducing the tendency of air to flow inward and hence increasing the tendency of oil to leak outward through seal 19.

It was then found that the above-described pressure gradient could be materially reduced so as to eliminate oil leakage by placing one or more circumferentially spaced radially arranged dowel pins in the annular space between shaft flange 3a and end cap 28. In the accompanying drawings the function of these dowel pins is performed by radially arranged ribs 40, which may be fabricated in any way but are shown as being cast integral with the end cap 28 and extending radially outward to the circumferential flange 41. The ribs 40 preferably form a clearance space 3b with the adjacent surface of flange 3a which is as small as can conveniently be used, taking into consideration the requirements of necessary manufacturing tolerances and ease of assembly and maintenance.

I believe that the remarkable effect on oil leakage produced by this simple revision of the bearing housing end cap 28 is due to the following. During operation without the ribs 40, the rotating flange 3a creates a strong vortex whirl of the air occupying the annular space between flange 3a and the adjacent surface of end cap 28. This vortex whirl accounts for the radial pressure gradient noted in my experiments; and, as indicated above, it was this radial pressure gradient which induced the leakage of oil outwardly through shaft seal 19. By inserting the fins or ribs 40, this vortex whirl is prevented, thus eliminating the pressure gradient with the accompanying tendency to leak oil.

I have demonstrated repeatedly that my invention contributes a very appreciable reduction in the oil leakage from turbosuperchargers of the type described.

While my invention has been described in connection with the problem of preventing oil leakage in an aircraft turbosupercharger, it will be apparent it is also applicable to other machines having sealed casings maintained at sub-ambient pressures during operation with a high speed rotating shaft projecting through sealing means in a wall of the casing, and having a radially extending rotating flange closely adjacent the exterior end of the shaft seal.

It will further be obvious that, while the invention has been described as particularly applicable to bearing housings maintained at sub-ambient pressures, it will also have certain utility in preventing leakage from casings maintained at or somewhat above the pressure of the atmosphere immediately surrounding the machine. I therefore desire it to be understood that the appended claims are intended to cover all such modifications as fall within the true spirit and scope of the invention.

What I claim as new and desire to secure by Letters Patent of the United States, is:

1. In a machine having a sealed housing maintained during operation at sub-ambient pressure and a high-speed rotating shaft extending through sealing means in a wall of the housing with a radially extending flange member carried by said shaft and located outside said housing and adjacent the sealing means, an end cap for the housing adapted to surround the sealing means and having exterior fin means extending in the annular space between the end cap and said flange from a location closely adjacent the shaft radially outwardly at least as far as the circumference of the flange member to prevent the creation of a vortex whirl in the space between the end cap and the adjacent rotating flange member, whereby the tendency of fluid inside the housing to leak outward through the seal is reduced.

2. In combustion, a sealed housing adapted to be maintained at sub-ambient pressures during operation, a high-speed rotating shaft extending through a wall of the housing, sealing means around the shaft for resisting the flow of fluids from inside the housing outward along the shaft, a radially extending flange member carried by the shaft and located outside said housing and adjacent the sealing means, and stationary rib means extending in the annular space between the housing and the adjacent rotating flange from a location closely adjacent the shaft radially outwardly at least as far as the circumference of the flange member to prevent the creation of a vortex whirl in said space, whereby the tendency of fluid inside the housing to leak outward through said sealing means is reduced.

3. A sealed bearing housing arrangement including walls defining a casing, a shaft rotatably supported in the casing with a portion extending outwardly through the casing walls, sealing means for resisting the leakage of fluids along the shaft and through the casing wall, a flange member carried by the shaft adjacent the exterior side of the sealing means and having a radially extending surface defining an annular space with adjacent portions of the casing, and rib means carried by the casing and extending in said annular space between the casing and the flange member from a point closely adjacent the shaft radially outwardly at least as far as the circumference of the flange member for preventing the creation of a vortex whirl therein, whereby the tendency of fluids inside the casing to leak outwardly through the sealing means is reduced.

RAYMOND B. WADE.

REFERENCES CITED

The following references are of record in the file of this patent:

UNITED STATES PATENTS

| Number | Name | Date |
|---|---|---|
| 2,127,865 | Goddard | Aug. 23, 1938 |
| 2,259,620 | Couch | Oct. 21, 1941 |
| 2,302,822 | Warner | Nov. 24, 1942 |

Certificate of Correction

Patent No. 2,541,850

February 13, 1951

RAYMOND B. WADE

It is hereby certified that error appears in the printed specification of the above numbered patent requiring correction as follows:

Column 3, line 1, for "creat" read *create*; column 4, line 27, for the word "combustion" read *combination*;

and that the said Letters Patent should be read as corrected above, so that the same may conform to the record of the case in the Patent Office.

Signed and sealed this 15th day of May, A. D. 1951.

[SEAL]

THOMAS F. MURPHY,
*Assistant Commissioner of Patents.*